Sept. 7, 1943. J. W. WHITE 2,329,095
BRAKE
Filed Feb. 16, 1939 5 Sheets-Sheet 1

INVENTOR.
JOHN W. WHITE
BY Jerome R. Cox
ATTORNEY.

Sept. 7, 1943.  J. W. WHITE  2,329,095
BRAKE
Filed Feb. 16, 1939  5 Sheets-Sheet 4

INVENTOR.
JOHN W. WHITE.
BY Jerome R. Cox
ATTORNEY.

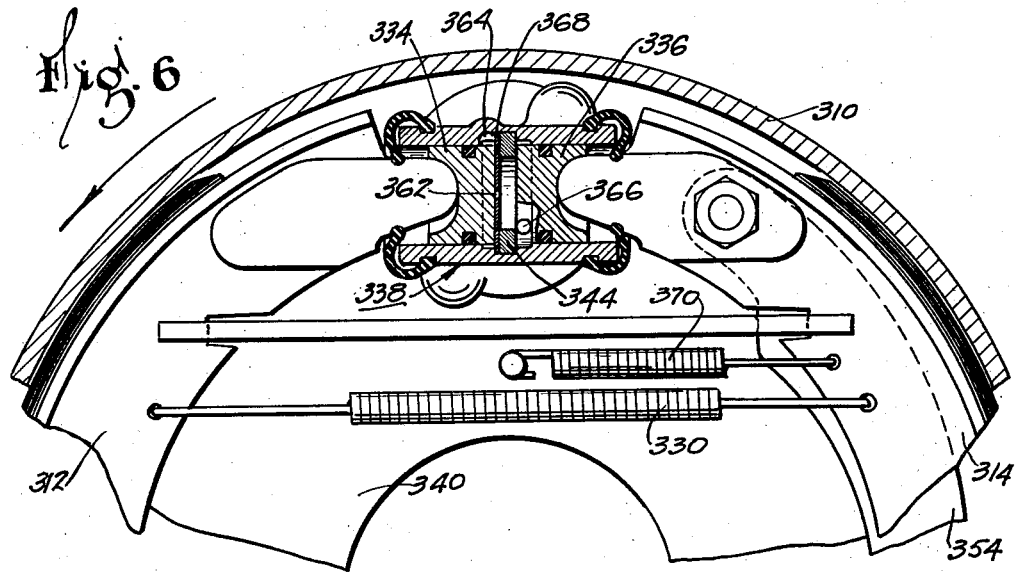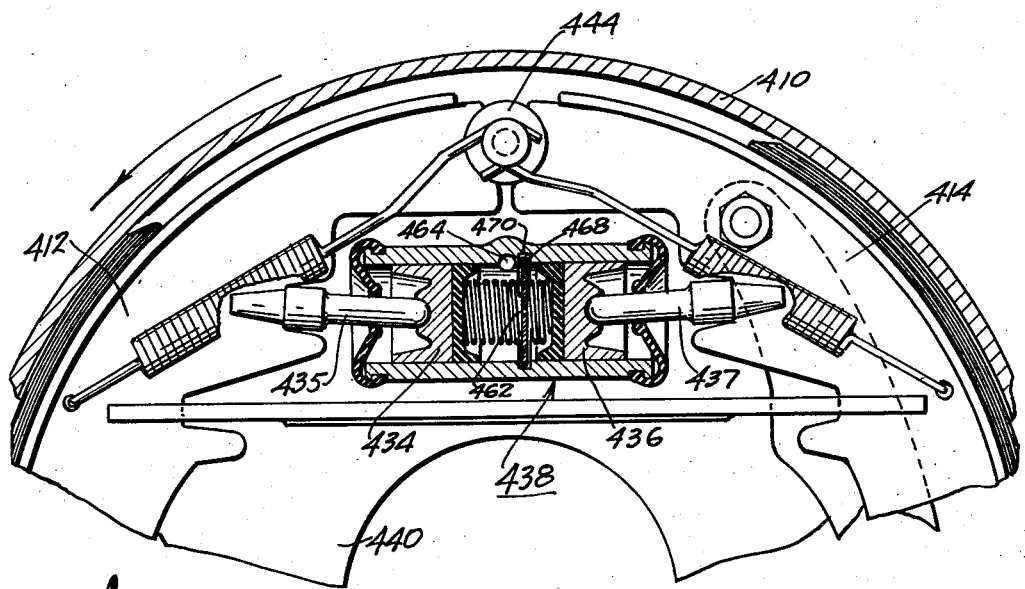

Patented Sept. 7, 1943

2,329,095

UNITED STATES PATENT OFFICE 2,329,095

BRAKE

John William White, South Bend, Ind., assignor to Bendix Aviation Corporation, South Bend, Ind., a corporation of Delaware Application February 16, 1939, Serial No. 256,705

21 Claims. (Cl. 188—152)

This application is in part a continuation of my copending application Serial No. 212,868, now Patent No. 2,294,351, Aug. 25, 1942. The inventions involved relate to braking systems of the fluid pressure type. In illustrating my inventions, I have shown several wheel brakes having hydraulic wheel cylinders for applying said brakes, the cylinders being provided with internal stops or anchoring means and equipped with simple improved sealing means.

One of the objects of my invention is to provide a novel wheel cylinder for a braking system, the cylinder having two oppositely acting pistons therein adapted to give a longer stroke than has heretofore been obtained.

Another object of the invention is to provide a wheel cylinder for the braking system having means such as a plate or stop at its inner periphery (1) to limit the travel of the retracting pistons so that they will not overrun their respective chambers, (2) to position the shoes when retracted, and (3) to serve as anchors for taking the braking torque.

Other objects and desirable particular constructions and arrangement of parts will become apparent upon reference to the following detailed description of the several illustrative embodiments, shown in the accompanying drawings, in which:

Figure 3a is a close-up of the piston and sealing element of Figure 3 showing them in their relative positions before assembly into the hydraulic motor or wheel cylinder of Figure 3;

Figure 6 is a view similar to Figure 5 showing a further modification of a wheel cylinder constructed according to my invention; and Figure 7 is a view similar to Figure 6 showing a further modified type of wheel brake structure constructed according to my invention.

Figure 1:
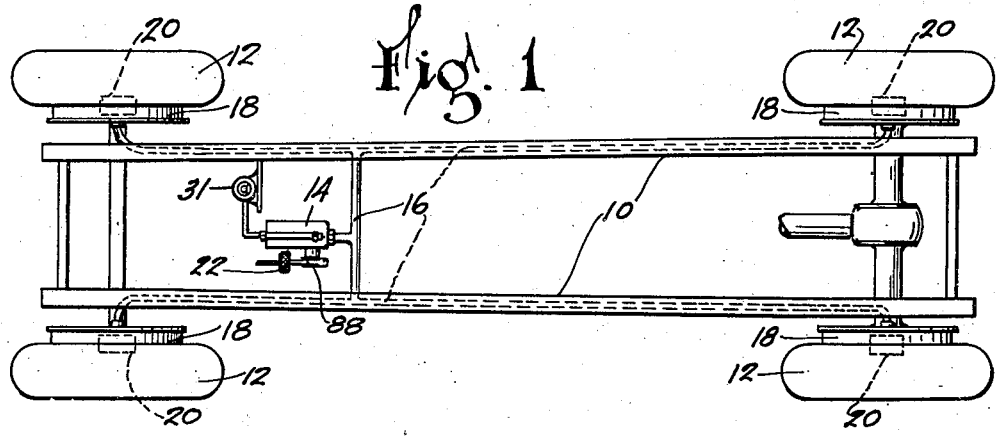
Figure 1 is a plan view of a chassis of an automobile equipped with brakes constructed according to my invention.
Figure 2:
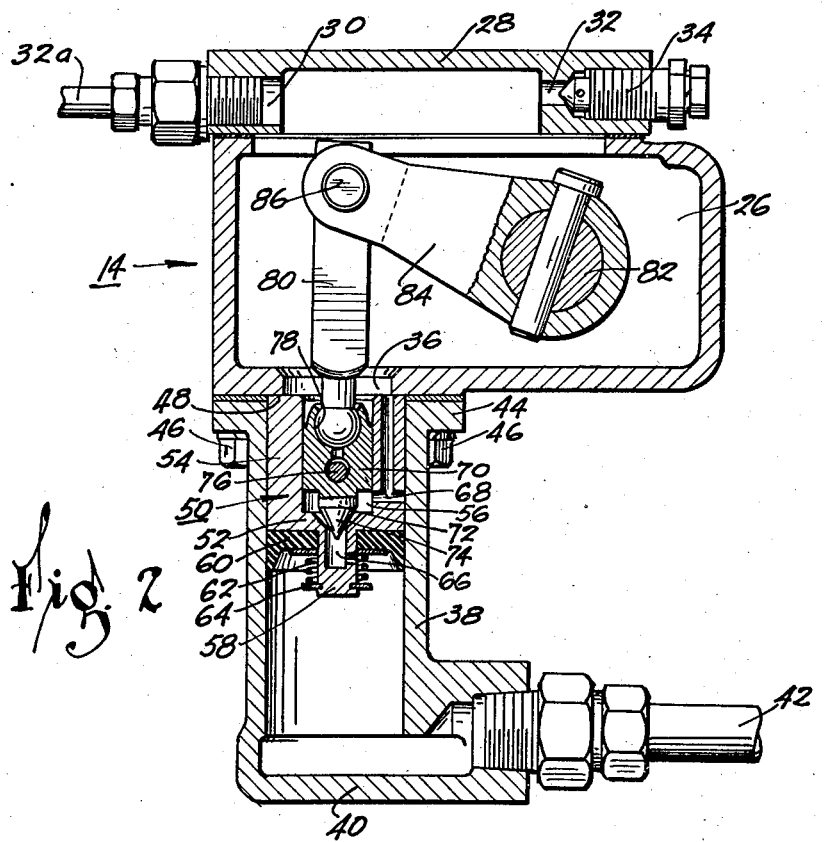
Figure 2 is a view partly in section showing a master cylinder constructed according to my invention.

Referring to Figure 1 of the drawings, I have shown for illustration of my invention a braking system for an automobile having a frame 10 and wheels 12. The braking system shown for illustration comprises a master cylinder 14, conduits 16, brakes 18 and wheel cylinders 20. The master cylinder is arranged to be operated by means of a pedal 22 which is connected to a shaft extending into the reservoir 26.

The master cylinder which is generally designated 14 comprises a reservoir 26 suitably mounted on the frame of a vehicle. The reservoir has a removable top 28 provided with ports 30 and 32. The port 30 is connected by a pipe 32 to a supply tank 31 and the port 32 is closed as by a bleeder screw. The reservoir also has arranged in the bottom thereof an opening 36.

A cylinder 38 depending from the bottom of the reservoir is closed at one end as by a head 40 provided with a discharge port 42 and open at its other end. The cylinder has at its open end a radial flange 44, secured to the bottom of the reservoir as by bolts 46 so as to support the cylinder in axial alignment with the opening 36. The diameter of the cylinder is greater than the diameter of the opening 36, and hence the perimeter defining the opening 36 overhangs the open end of the cylinder and thus provides an annular shoulder 48, the purpose of which will hereinafter appear.

A piston 50 reciprocable in the cylinder 38 includes a head 52 and a skirt 54 providing a chamber 56 back of the head. A concentric extension 58 on the head 52 has sleeved thereon a sealing cup 60 seated on the head and held against displacement by a spring 62 interposed between the cup 60 and a retaining ring 64 seated in a groove in the extension adjacent the free end thereof. The extension has a passage 66 therein extending through the head of the piston so as to provide a communication between that portion of the cylinder forward of the piston and the chamber 56, and arranged in the wall of the skirt 54 of the piston is a passage 58 providing a communication between the chamber 56 and the reservoir 26.

A plunger 70 reciprocable in the chamber 56 has a concentric extension 72 provided with a conical end 74 adapted to enter and close the passage 66. The plunger 70 is attached to the piston 50 by an overrunning connection 76, and a recess 78 in the back of the plunger has suitably secured therein one end of a link 80. A shaft 82 mounted transversely of the reservoir has keyed thereto within the reservoir an arm 84 pivotally connected as at 86 to the other end of the link 80, and suitably secured to the shaft outside of the reservoir is a foot pedal lever 88.

Figure 3:
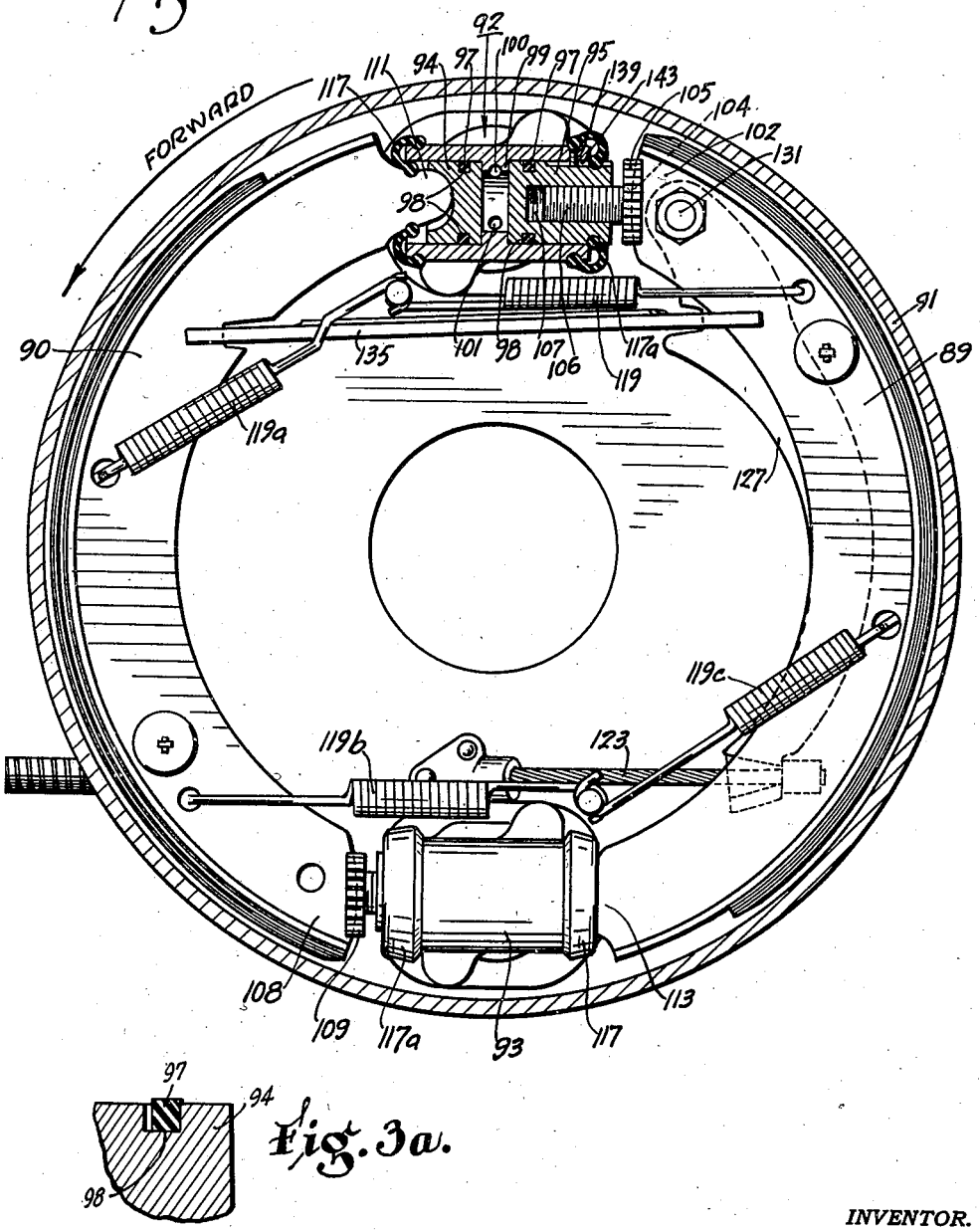
Figure 3 is a view in vertical section showing a wheel brake structure constructed according to my invention.

In Figure 3, I have shown the details of my new and improved wheel brake structure. In that figure, shoes 89 and 90 are adapted to be moved into contact with a rotating brake drum 91 by wheel cylinders 92 and 93. Depending on the direction of rotation of the drum, the shoes anchor separately through one end or the other on wheel cylinders as will be later explained.

Each wheel cylinder 92 or 93 is provided with a pair of pistons 94 and 95. Each piston 94 and 95 is provided with a square-in-section sealing ring 97 set in a square-in-section groove 98, the groove (see Figure 3a) being slightly wider than the ring but the ring being at least as thick as the groove is deep. Between the pistons 94 and 95, the cylinder is formed with a ridge or stop 99 against which the inner ends of the pistons abut. Inlet and bleed ports 100 and 101 are provided. In forward braking (drum moving counterclockwise) the end 102 of the shoe 89 anchors in a groove 104 formed in the head 105 of a bolt 106 threaded in a bore 107 formed in the piston 95. While groove 104 is shown as of substantial depth in Figure 3, in actual practice it is made fairly shallow so that the wheel 105 may be rotated for adjustment, the end of the shoe being forced out of the groove as the wheel turns against the spring 119. However, the groove is deep enough to prevent turning except when it is desired to adjust the brake. The end 108 of shoe 90 similarly anchors on a head 109. The shoe 90 is applied by the piston 94 acting on the end 111 of the shoe 90. The shoe 89 is similarly applied by the corresponding piston of the cylinder 93 acting on the end 113 of said shoe 89.

In anchoring on reverse braking the shoes 90 and 89 anchor through ends 111 and 113 on piston 94 and the corresponding piston of cylinder 93 respectively. The stops 99 are arranged to take the anchoring load as well as arranged to position the piston and shoes when the brakes are released.

Dust caps 117 and 117a are provided and springs 119, 119a, 119b and 119c are arranged to return the shoes to the released position shown and to control the initial brake application. The brakes may also be applied by mechanical means comprising a cable 123 connected to one end of a lever 127 pivoted on shoe 89 at 131 and acting through a strut link 135 on shoe 90.

The brakes may be adjusted for wear by rotation of the serrated heads 105 of the bolts 106, thus unscrewing the bolts 106 in the bores 107 of the pistons 95, rotation of the piston during adjustment being prevented by pins 139 in slots 143.

Figure 4:
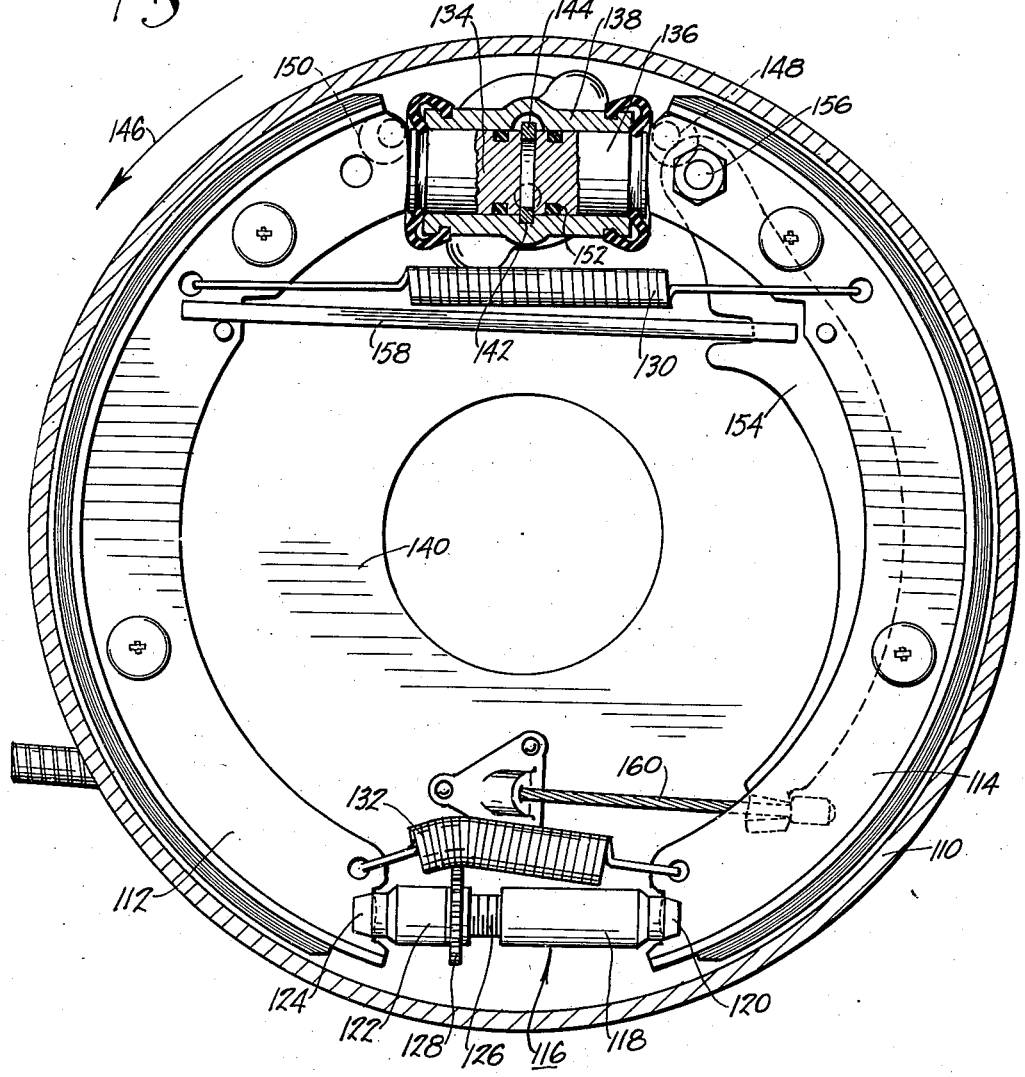
Figure 4 is a view similar to Figure 3 showing a modified type of wheel brake structure constructed according to my invention.

In Figure 4, there is shown an arrangement of my invention applied to a duo servo brake. Therein a brake drum 110 is arranged to inclose a primary shoe 112 and a secondary shoe 114. The shoes 112 and 114 are connected by an adjusting device 116 comprising an internally threaded sleeve 118 having its closed end straddling the shoe 112 as at 120, a second sleeve 122 straddling the shoe 114 at 124, and a threaded screw 126 threaded into the sleeve 118 and having its opposite end freely rotatable in the sleeve 122 and having a wheel 128 secured thereto for rotating the sleeve to accomplish the adjustment. The shoes 112 and 114 are also connected by return springs 130 and 132, the latter cooperating with notches on the wheel 128 to maintain the adjustment. The shoes are moved into drum contact for applying the brake by pistons 134 and 136 positioned in a wheel cylinder 138 secured to the backing plate 140. The cylinder 138 is formed with a groove 142 substantially centrally thereof and within this groove there is positioned a stop ring 144. As will later be pointed out, this ring serves not only to position the shoes in the return position but also serves to take the anchoring load when the brakes are applied. The ring is originally formed with an external diameter substantially the same as the internal diameter of the cylinder and then is forced into the groove by a punch which spreads the ring. When the brake is applied while the vehicle is going in the forward direction and the drum moves in the direction of the arrow 146, the rotation of the drum moves the shoes in a clockwise direction and the shoe 112 anchors through the strut 116 on the shoe 114 which in turn anchors on the piston 136. The piston 136 anchors on the ring 144 which transmits the load to the cylinder 138 and through the cylinder to the backing plate. When the brake applying force is released, the springs 130 and 132 return the shoes to the position shown in which both pistons 136 and 134 contact the ring 144 and thus the shoes are positioned. Eccentric adjustment screws 148 and 150 may also be used for positioning the shoes in the return position.

I seal the pistons by means of my improved sealing rings. Like the arrangement in Figure 3, each of the pistons is formed with a groove such as the groove 152. This groove is of square shape and in it is positioned a rubber sealing ring having a depth radially of the cylinder greater than the depth of the groove but having a width lengthwise of the cylinder shorter than the width of the groove. The liquid on the inner side of the ring forces the ring against the outer edge of the groove and into contact with the cylinder wall and thus seals the cylinder.

For applying the brakes by means of the ordinary hand or emergency lever, I provide a lever 154 pivoted on the shoe 112 as at 156 and connected by a strut 158 with the shoe 114. The end of the lever 154 opposite to the pivot is connected to a cable 160 leading to the hand lever.

Figure 5:
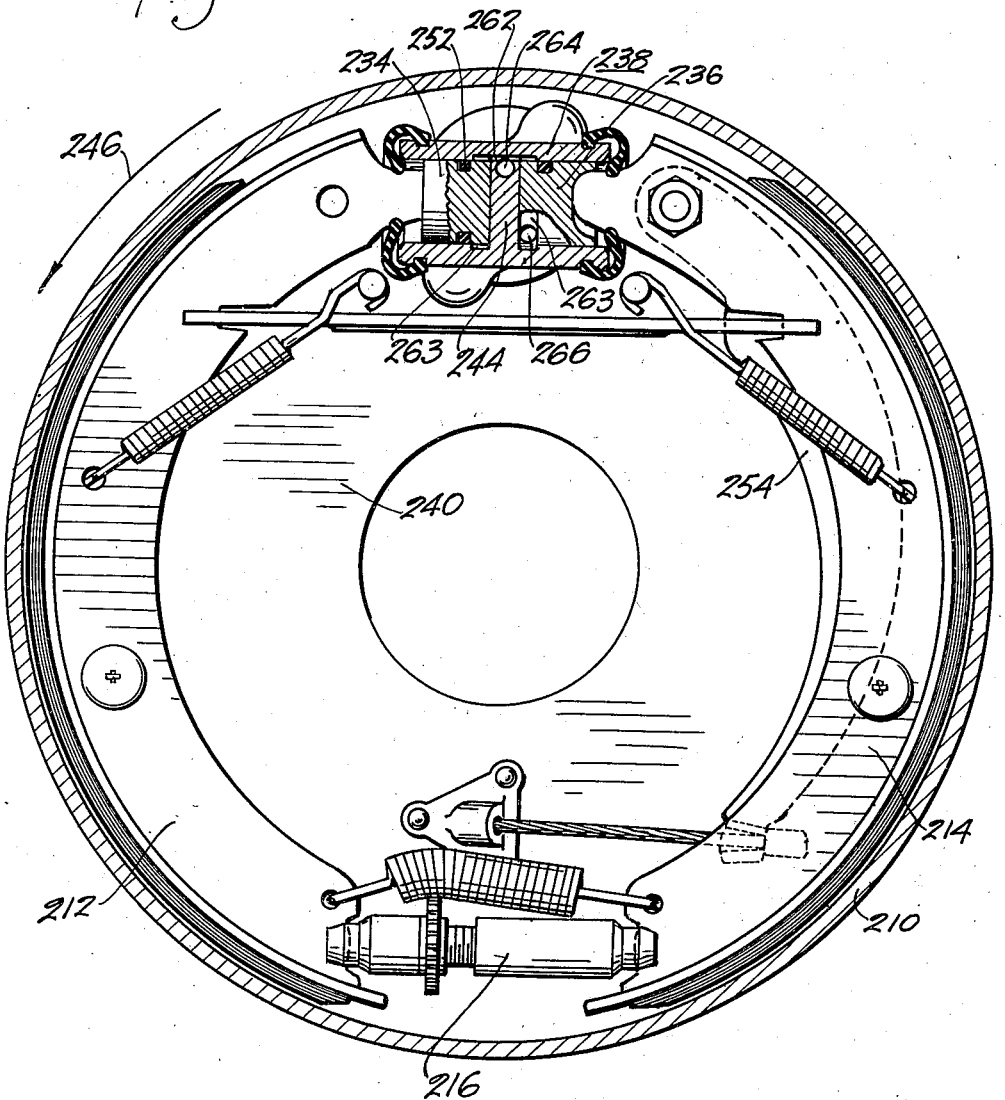
Figure 5 is a view similar to Figure 4 showing in vertical section a wheel brake having a modified form of wheel cylinder constructed according to my invention.

In Figure 5, I have shown a view of another duo servo brake to which my invention has been applied. Therein the drum 210 incloses a primary shoe 212 and a secondary shoe 214 connected by an adjustment strut 216 and actuated by a wheel cylinder 238. The wheel cylinder 238 is provided with pistons 234 and 236 having sealing rings such as 252. The pistons 234 and 236 anchor on a partition 244 formed integrally with the cylinder 238 and dividing the cylinder into two portions. These two separated portions are connected by a small equalizing opening 262. Connected to the equalizing opening is the bleed port 264 and there is also provided the inlet port 266 through which fluid is introduced into the cylinder from the brake conduits. Grooves 263 in the wheel cylinder wall adjacent the partition 244, joined by the passage 262, permit fluid flow between the chambers of the wheel cylinder and the fluid source or bleed port 264 when the pistons are completely returned in the "brake off" position or when either of the pistons are anchored against the partition 244 during the application of the brake.

When the brake is applied if the vehicle is travelling in a forward direction as indicated by the arrow 246, the piston 236 remains in contact and anchors on the partition 244 and thus the braking torque is taken by the partition 244. Inasmuch as the piston 236 does not leave the partition 244 and inasmuch as the shoe 214 does not move from the piston 236, there is no click in forward braking. In reverse braking the shoes initially move as in forward braking. However, as the shoes move into drum contact the shoe 214 is moved away from the piston 236 and anchors through the strut 216 on the shoe 212. Braking torque for both shoes is exerted through the shoe 212 on the piston 234 and that piston is forced back with the partition 244. At the same time the piston 236 is forced outward to follow up the shoe 214. However, due to the small size of the opening 262 through which the liquid must travel, as the piston 234 moves back into contact with the stop 244, this movement is cushioned and there is no click in reverse braking.

Due to the cushioning effect of the opening 262, the springs 254 may be of differing effective strength whereupon the action is as described above, or the springs may be of equal effective strength whereupon the return to the anchor is cushioned in both directions and no click is possible.

In Figure 6, I have shown a brake somewhat similar to that shown in Figure 5. Therein the drum 310 incloses shoes 312 and 314 connected by a strut (not shown) similar in every particular to the strut 216. The cylinder 338 has pistons 334 and 366 which anchor on the ring 344 which is similar to the ring 144. To the left of the ring 344 there is provided a metallic disk 368 formed with an equalizing port 362. To the left of the disk 368 there is positioned the bleed opening 364 and to the right of the disk there is positioned the inlet opening 366. The shoes 314 and 312 are connected by a return spring 330 and an unbalancing spring 370 serves to insure that the secondary shoe 314 will be maintained in contact with the piston 336 and the piston 336 in contact with the ring 344 during initial drum application. Thus the liquid for initial drum application passes through the port 362. In reverse braking this liquid also has to pass back through the opening 362 and thus cushions the return of the shoes and pistons to the anchor. The unbalancing spring 370 may be omitted if desired as explained in connection with Figure 5.

My improved means of insuring against click in return braking is also applicable to a brake in which the shoes anchor on an anchor which is formed outside of the cylinder.

As shown in Figure 7, the drum 410 is provided with shoes 412 and 414 which anchor on the anchor 464. The cylinder 438 is provided with pistons 434 and 436 which actuate the shoes 412 and 414 by struts 435 and 437 respectively. Springs 230 are shown of equal strength and tend to balance the shoes, although an unbalancing spring may be provided if desired. A thin metal diaphragm 468 formed with an equalizing port 462 is pressed into a groove 470 formed in the cylinder 438 and serves to cushion the flow of liquid should the brake shoes move away from the anchor in forward or in reverse braking. It may be noted that the diaphragm 468 is positioned to the right of the bleed opening 464 which is positioned substantially centrally of the cylinder.

In the operation of each of the embodiments of my invention, pressure upon the pedal forces fluid from the master cylinder through the conduit to the wheel cylinders. Thereupon the shoes are moved into contact with the drum. Depending on the direction of drum rotation, each shoe anchors on one end or the other and in the case of the embodiments shown in Figures 4 and 7 inclusive, the primary shoe anchors on the secondary shoe. In the case of the brakes shown in Figures 3 to 7 inclusive, the brakes anchor on a partition or ring secured centrally within the cylinder on the cylinder and through the cylinder on the backing plate. In the brake shown in Figures 3 to 7 inclusive also, my improved packing rings inserted in grooves in the pistons are used for sealing the cylinder.

It is to be understood that the above-described embodiments of my invention are for the purpose of illustration only and various changes may be made therein without departing from the spirit and scope of my invention.

I claim:

1. For a hydraulic brake system, a wheel cylinder formed with a central internal ridge, a pair of pistons in said cylinder, each formed with a rectangularly shaped groove extending around it, and a rectangular shaped annular packing in each said groove, the groove being slightly wider than the packing.

2. For a hydraulic brake system, a wheel cylinder formed with a central internal ridge, a piston in said cylinder, formed with a rectangularly shaped groove extending around it, and a rectangular shaped annular packing in said groove, the groove being slightly wider than the packing.

3. For a hydraulic brake system, a pair of wheel cylinders, each formed with a ridge, a pair of pistons in said cylinders, each formed with a rectangularly shaped groove extending around it, a rectangular shaped annular packing in each said groove, the groove being slightly wider than the packing, one of said pistons of each cylinder being formed with a threaded bore, a threaded adjusting screw positioned in each said bore, a pair of brake shoes applied by said pistons and each contacting with one adjusting screw at one end and with the unthreaded piston of the other cylinder at the other end and each anchoring in one direction of rotation of the drum through the adjusting screw and threaded piston on the ridge of one of the cylinders and in the other direction of rotation of the drum through the unthreaded piston on the ridge of the other cylinder, and means for preventing rotation of said threaded piston in said cylinder.

4. For a hydraulic brake system, a wheel cylinder having a pair of pistons, and formed with a central groove, a washer in said groove, means on each of said pistons for contacting said washer and thus positioning the piston when the brake is retracted.

5. In a brake for an automotive vehicle, a drum, a pair of shoes within said drum, both arranged to anchor through one shoe in one direction of rotation and through the other shoe in the other direction of rotation, and a hydraulic wheel cylinder for applying said shoes to the drum provided with a pair of pistons and provided with a single centrally disposed anchor portion within the cylinder on which both pistons anchor.

6. In a brake for an automotive vehicle, a drum, a pair of shoes within said drum, both arranged to anchor through one shoe in one direction of rotation and through the other shoe in the other direction of rotation, and a hydraulic wheel cylinder for applying said shoes to the drum provided with a pair of pistons and provided with a central anchor portion within the cylinder on which the pistons anchor, said pistons also being formed with rectangular grooves in which there is positioned a rectangular packing formed with a depth greater than the groove and a width less than the groove.

7. In a brake for an automotive vehicle, a drum, a pair of shoes within said drum, both arranged to anchor through one shoe in one direction of rotation and through the other shoe in the other direction of rotation, and a hydraulic wheel cylinder for applying said shoes to the drum provided with a pair of pistons and provided with a single centrally disposed anchor portion within the cylinder on which both pistons anchor, said central anchor being formed integral with the cylinder.

8. In a brake for an automotive vehicle, a drum, a pair of shoes within said drum, both arranged to anchor through one shoe in one direction of rotation and through the other shoe in the other direction of rotation, and a hydraulic wheel cylinder for applying said shoes to the drum provided with a pair of pistons and provided with a central anchor portion within the cylinder on which the pistons anchor, said central anchor comprising a pressed metallic ring forced into a groove in said cylinder and held within said groove.

9. A cylinder for applying hydraulic brakes formed with an internal central anchor and provided with a partition separating the two sides of the cylinder, said partition being formed with a restricted port for preventing click.

10. A cylinder for applying hydraulic brakes formed with an internal central anchor and provided with a partition separating the two sides of the cylinder and formed with a restricted port for preventing click, said central member serving as a stop for the return position of the shoes.

11. A cylinder for applying hydraulic brakes formed with an internal central anchor and provided with a partition separating the two sides of the cylinder and formed with a restricted port for preventing click, said cylinder also having a bleed port arranged on one side of said partition.

12. A cylinder for applying hydraulic brakes formed with an internal central anchor and provided with a partition separating the two sides of the cylinder, said partition being formed with a restricted port for preventing click, said cylinder also having an inlet port arranged on one side of the partition.

13. A cylinder for applying hydraulic brakes formed with an internal central anchor partition and provided with a partition separating the two sides of the cylinder and formed with a restricted port for preventing click, said central member comprising an anchor ring pressed into a groove in the cylinder and provided with a partition disk for preventing click.

14. A cylinder for applying hydraulic brakes provided with a central partition formed with an expanded disk having a restricted port for preventing click, and means for anchoring the shoes of the brake associated with said cylinder.

15. A hydraulic brake comprising a drum, a pair of shoes, each of which is arranged to anchor on one end in one direction of rotation and on the other end in the other direction of rotation, and a pair of applying wheel cylinders positioned between the opposite ends of said shoes and each formed with a single centrally disposed member serving as an anchor for both of the shoes, depending on the direction of rotation of the drum.

16. A hydraulic brake comprising a drum, a pair of shoes, each of which is arranged to anchor on one end in one direction of rotation and on the other end in the other direction of rotation, and a pair of applying wheel cylinders positioned between the opposite ends of said shoes and each formed with a single centrally disposed member serving as an anchor for both of the shoes, depending on the direction of rotation of the drum, said central member being formed integral with said cylinder.

17. In a hydraulic brake comprising a drum, a pair of shoes in said drum, a cylinder for applying said shoes provided with a pair of pistons, and a single centrally disposed member in said cylinder on which both of said pistons and through said pistons said shoes anchor.

18. In a hydraulic brake comprising a drum, a pair of shoes in said drum, a cylinder for applying said shoes provided with a pair of pistons, and a central member in said cylinder on which said pistons and through said pistons said shoes anchor, said pistons each being formed with a rectangular groove in each of which there is positioned a metallic packing for sealing the cylinder.

19. In a brake for an automotive vehicle, a drum, a friction element within said drum arranged to anchor at one end or the other according to the direction of drum rotation, and a hydraulic wheel cylinder for applying said friction element to the drum provided with a piston and provided with a central anchor portion within the cylinder on which the piston may anchor, said central anchor comprising a pressed metallic ring forced into a groove in said cylinder and held within said groove.

20. In a hydraulic brake comprising a drum, a pair of shoes in said drum, a cylinder for applying said shoes provided with a pair of pistons, and a central member in said cylinder on which said pistons and through said pistons said shoes anchor, said pistons each being formed with a rectangular groove in each of which there is positioned a packing for sealing the cylinder.

21. For a brake having a pair of shoes, a wheel-brake cylinder having a pair of shoe actuated pistons reciprocable therein and associated each with one of the shoes, and having means for cushioning the passage of fluid from one end of the cylinder to the other when one of the pistons is forced toward the center of the cylinder, said means constituting a partition in the cylinder between the shoes having a small passage therethrough to allow a restricted flow of fluid.

JOHN WILLIAM WHITE.